US012362592B2

(12) United States Patent
Luo et al.

(10) Patent No.: US 12,362,592 B2
(45) Date of Patent: Jul. 15, 2025

(54) POWER FACTOR CORRECTION CIRCUIT, POWER FACTOR CORRECTION ASSEMBLY AND ON-LINE UNINTERRUPTIBLE POWER SUPPLY COMPRISING SAME

(71) Applicant: Eaton Intelligent Power Limited, Dublin (IE)

(72) Inventors: Cheng Luo, Shanghai (CN); Huiting Xin, Shanghai (CN); Han Li, Shanghai (CN); Dawei Zheng, Shenzhen (CN); Hualiang Li, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/613,225

(22) Filed: Mar. 22, 2024

(65) Prior Publication Data
US 2024/0235251 A1 Jul. 11, 2024

Related U.S. Application Data

(63) Continuation of application No. 17/299,730, filed as application No. PCT/EP2019/025432 on Dec. 3, 2019, now Pat. No. 11,967,859.

(30) Foreign Application Priority Data
Dec. 4, 2018 (CN) .......................... 201811473139.2

(51) Int. Cl.
*H02J 9/06* (2006.01)
*H02M 1/00* (2007.01)
(Continued)

(52) U.S. Cl.
CPC ............. *H02J 9/062* (2013.01); *H02M 1/007* (2021.05); *H02M 1/4233* (2013.01);
(Continued)

(58) Field of Classification Search
CPC ...... H02J 9/062; H02M 1/007; H02M 1/4233; H02M 3/33571; H02M 3/33573;
(Continued)

(56) References Cited

U.S. PATENT DOCUMENTS

| 2002/0039302 A1 | 4/2002 | Hanaoka et al. |
| 2013/0057200 A1 | 3/2013 | Potts .................. H02M 7/4807 |
|  |  | 320/107 |

(Continued)

FOREIGN PATENT DOCUMENTS

| CN | 201774702 U | 3/2011 |
| CN | 102055348 A | 5/2011 |

(Continued)

OTHER PUBLICATIONS

English Translation of Rejection Decision for CN 201811473139.2 citing NPL reference: Xuanzhong, Liu editor, "Practical Power Supply Technology Manual: Modular Power Supply Section," Liaoning Science and Technology Press, Jan. 1999 (pp. 16-17), 7 pgs.

(Continued)

*Primary Examiner* — Elim Ortiz
(74) *Attorney, Agent, or Firm* — Stanek Lemon Crouse Meeks, PA

(57) ABSTRACT

The present invention provides a power factor correction circuit, a power factor correction assembly and an on-line uninterruptible power supply including the same. The power factor correction circuit comprises a pulse width modulated rectifier and an isolated DC-DC converter, wherein an output of the pulse width modulated rectifier is connected to an input of the isolated DC-DC converter. The power factor correction assembly comprises a plurality of power factor correction circuits described above, wherein inputs of pulse width modulated rectifiers in the plurality of power factor correction circuits are connected in series, and outputs of (Continued)

isolated DC-DC converters in the plurality of power factor correction circuits are connected in parallel. The power factor correction assembly of the present invention needs no line-frequency transformer and has the advantages of small size, low cost and improved operation reliability.

4 Claims, 13 Drawing Sheets

(51) Int. Cl.
    *H02M 1/42*     (2007.01)
    *H02M 3/335*     (2006.01)

(52) U.S. Cl.
    CPC ... *H02M 3/33571* (2021.05); *H02M 3/33573* (2021.05); *H02M 3/33584* (2013.01)

(58) Field of Classification Search
    CPC .......... H02M 3/33584; H02M 1/0074; H02M 7/4807; H02M 1/4208; Y02B 70/10; Y02P 80/10
    USPC ................ 320/82, 103, 108; 363/17, 71, 98
    See application file for complete search history.

(56) References Cited

U.S. PATENT DOCUMENTS

| | | | |
|---|---|---|---|
| 2014/0103860 A1 | 4/2014 | Kominami et al. | |
| 2016/0261205 A1* | 9/2016 | Kolar | H02M 1/32 |
| 2017/0005471 A1* | 1/2017 | Kim | H02J 3/381 |
| 2020/0186038 A1 | 6/2020 | Jiang et al. | |
| 2022/0376613 A1 | 11/2022 | Britton | H02M 1/44 |

FOREIGN PATENT DOCUMENTS

| | | | |
|---|---|---|---|
| CN | 107359688 | 11/2017 | |
| CN | 107359688 A | 11/2017 | ............ G01R 31/40 |
| WO | WO2014026840 | 2/2014 | |

OTHER PUBLICATIONS

Xiao Jungang, Hubei Science and Technology Press, Basics of Pure Electric Cars, Published Apr. 30, 2018, pp. 217-218.

International Search Report; PCT/EP2019/025432; Mar. 4, 2020; 3 pages.

International Preliminary Report on Patentability; Jun. 8, 2021; 8 pages.

* cited by examiner

POWER FACTOR CORRECTION CIRCUIT, POWER FACTOR CORRECTION ASSEMBLY AND ON-LINE UNINTERRUPTIBLE POWER SUPPLY COMPRISING SAME

CROSS-REFERENCE TO RELATED APPLICATIONS

This application is a continuation of U.S. patent application Ser. No. 17/299,730; filed Jun. 3, 2021, which is a 35 U.S.C. § 371 National Stage Entry of International Application No. PCT/EP2019/025432 having an international filing date of Dec. 3, 2019, which claims the benefit of Chinese Patent Application No. 201811473139.2 entitled POWER FACTOR CORRECTION CIRCUIT, POWER FACTOR CORRECTION ASSEMBLY AND ON-LINE UNINTERRUPTIBLE POWER SUPPLY COMPRISING SAME, filed Dec. 4, 2018, the disclosures of each of which are incorporated herein by reference in their entireties.

TECHNICAL FIELD

The present invention relates to the field of electronic circuits, and in particular, to a power factor correction circuit, a power factor correction assembly and an on-line uninterruptible power supply comprising the same.

BACKGROUND

The operating principle of an on-line uninterruptible power supply is as follows: no matter whether the grid voltage is normal, an alternating current voltage used by a load needs to pass through an inverter so that the inverter is always in an operating state. Given that on-line uninterruptible power supplies can continuously supply power to the load, they have been widely applied in various fields.

FIG. 1 is a circuit block diagram of an on-line uninterruptible power supply in the prior art. The on-line uninterruptible power supply 1 includes a power factor correction circuit 11, an inverter 12, and a bi-directional DC-DC converter 13.

When a low-voltage alternating current Vi' (for example, mains supply) is normal, a control device (not shown in FIG. 1) controls the power factor correction circuit 11 to convert the low-voltage alternating current Vi' at the input thereof into a direct current and then transmit the direct current to positive and negative direct-current buses 10, 10', and controls the bi-directional DC-DC converter 13 to transmit electric energy on the positive and negative direct-current buses 10, 10' to a rechargeable battery B, so as to charge the rechargeable battery B. When a failure occurs in the low-voltage alternating current Vi', the control device controls the bi-directional DC-DC converter 13 to transmit the direct current in the rechargeable battery B to the positive and negative direct-current buses 10, 10'. No matter whether the low-voltage alternating current Vi' is normal, the inverter 12 is controlled to convert the low-voltage direct current on the positive and negative direct-current buses 10, 10' into a low-voltage alternating current and then supply power to the load.

However, considering performance parameters of a power switching tube in the on-line uninterruptible power supply 1, the existing on-line uninterruptible power supply cannot be directly connected to an alternating-current power supply of a medium-voltage distribution network (1 kilovolt to 35 kilovolts). Accordingly, a bulky line-frequency transformer must be added to first convert a medium-voltage alternating current into a low-voltage alternating current and then transmit the low-voltage alternating current to an alternating current input of the on-line uninterruptible power supply. Under a high-power load, transmission lines for the low-voltage alternating current generate large costs and loss, thus lowering the profitability and efficiency of the entire power distribution system. In addition, an incoming cabinet and an outgoing cabinet matching the line-frequency transformer must be added, which increases equipment cost and floor area of the entire equipment, thus causing low power density.

SUMMARY

In view of the aforementioned technical problem in the prior art, an embodiment of the present invention provides a power factor correction circuit, comprising a pulse width modulated rectifier and an isolated DC-DC converter, wherein an output of the pulse width modulated rectifier is connected to an input of the isolated DC-DC converter.

Preferably, the pulse width modulated rectifier is a full-bridge pulse width modulated rectifier or a half-bridge pulse width modulated rectifier.

Preferably, the isolated DC-DC converter comprises:
an inverter, wherein an input of the inverter is connected to the output of the pulse width modulated rectifier;
a transformer, wherein a primary side of the transformer is connected to an output of the inverter; and
a rectifying device, wherein an input of the rectifying device is connected to a secondary side of the transformer, and an output of the rectifying device serves as an output of the isolated DC-DC converter.

Preferably, the inverter is a full-bridge inverter or a half-bridge inverter, the transformer is a high-frequency transformer having a working frequency greater than 10 kHz, and the rectifying device is a full-bridge pulse width modulated rectifier, a half-bridge pulse width modulated rectifier, or a bridge rectifying circuit.

Preferably, the power factor correction circuit further comprises a first fuse and a second fuse connected to an input of the pulse width modulated rectifier, and a third fuse and a fourth fuse connected to the output of the isolated DC-DC converter.

Preferably, the power factor correction circuit further comprises a first switch, a second switch, a third switch, and a fourth switch respectively connected in series to the first fuse, the second fuse, the third fuse, and the fourth fuse.

The present invention further provides a power factor correction assembly, comprising a plurality of power factor correction circuits described above, wherein inputs of pulse width modulated rectifiers in the plurality of power factor correction circuits are connected in series, and outputs of isolated DC-DC converters in the plurality of power factor correction circuits are connected in parallel.

Preferably, each of the power factor correction circuits further comprises a first fuse and a second fuse connected to the input of the pulse width modulated rectifier, a third fuse, and a fourth fuse connected to the output of the isolated DC-DC converter, and a first switch, a second switch, a third switch, and a fourth switch respectively connected in series to the first fuse, the second fuse, the third fuse, and the fourth fuse; and the power factor correction assembly further comprises fifth switches each connected between inputs of the power factor correction circuits.

Preferably, the power factor correction assembly further comprises a first control device, wherein when the plurality of power factor correction circuits are all normal, the first control device controls the first switch, the second switch, the third switch, and the fourth switch in each of the power factor correction circuits to all turn ON, and controls the fifth switches in the power factor correction assembly to all turn OFF; and when the plurality of power factor correction circuits include a failed power factor correction circuit, the first control device controls a fifth switch connected to an input of the failed power factor correction circuit to turn ON, and controls a first switch, a second switch, a third switch, and a fourth switch in the failed power factor correction circuit to all turn OFF, and meanwhile controls first switches, second switches, third switches, and fourth switches in other power factor correction circuits to all turn ON, and controls other fifth switches in the power factor correction assembly to turn OFF.

The present invention further provides an on-line uninterruptible power supply, comprising:

the power factor correction assembly described above, wherein an output of the power factor correction assembly is connected to positive and negative direct-current buses;

a bi-directional DC-DC converter assembly, connected between a rechargeable battery and the positive and negative direct-current buses; and an inverter assembly, wherein an input of the inverter assembly is connected to the positive and negative direct-current buses, and an output of the inverter assembly is used for providing an alternating current.

Preferably, the bi-directional DC-DC converter assembly comprises a plurality of bi-directional DC-DC converters connected in parallel.

Preferably, each of the plurality of bi-directional DC-DC converters comprises:

a bi-directional DC-DC conversion circuit, having a first connection end and a second connection end;

a sixth fuse and a seventh fuse respectively connected to a positive terminal and a negative terminal of the first connection end of the bi-directional DC-DC conversion circuit, and a sixth switch and a seventh switch respectively connected in series to the sixth fuse and the seventh fuse; and an eighth switch and a ninth switch respectively connected to a positive terminal and a negative terminal of the second connection end of the bi-directional DC-DC conversion circuit.

Preferably, the on-line uninterruptible power supply further comprises a second control device, wherein when the plurality of bi-directional DC-DC converters are all normal, the second control device controls the sixth switch, the seventh switch, the eighth switch, and the ninth switch in each of the plurality of bi-directional DC-DC converters to all turn ON; and when the plurality of bi-directional DC-DC converters include a failed bi-directional DC-DC converter, the second control device controls a sixth switch, a seventh switch, an eighth switch, and a ninth switch in the failed bi-directional DC-DC converter to all turn OFF, and controls sixth switches, seventh switches, eighth switches, and ninth switches in other bi-directional DC-DC converters to all turn ON.

Preferably, the inverter assembly comprises a plurality of inverters connected in parallel.

Preferably, each of the plurality of inverters comprises:

an inversion circuit;

a tenth fuse and an eleventh fuse respectively connected to a positive input terminal and a negative input terminal of the inversion circuit;

a tenth switch and an eleventh switch respectively connected in series to the tenth fuse and the eleventh fuse; and an output switch connected to an output terminal of the inversion circuit.

Preferably, the on-line uninterruptible power supply further comprises a third control device, wherein when the plurality of inverters are all normal, the third control device controls the tenth switch, the eleventh switch, and the output switch in each of the plurality of inverters to all turn ON; and when the plurality of inverters include a failed inverter, the third control device controls a tenth switch, an eleventh switch, and an output switch in the failed inverter to all turn OFF, and controls tenth switches, eleventh switches and output switches in other inverters to all turn ON.

The power factor correction circuit and power factor correction assembly of the present invention both do not require a line-frequency transformer and have the advantages of small size and low cost. An input of the power factor correction assembly can receive a medium-voltage alternating current, so as to improve system efficiency and operation reliability and implement the on-line service and hot-swap function.

BRIEF DESCRIPTION OF THE DRAWINGS

Embodiments of the present invention are further described below with reference to the accompanying drawings.

DETAILED DESCRIPTION

In order to make the objectives, technical solutions and advantages of the present invention clearer, the present invention is further described in detail below through specific embodiments with reference to the accompanying drawings.

Figure 1:
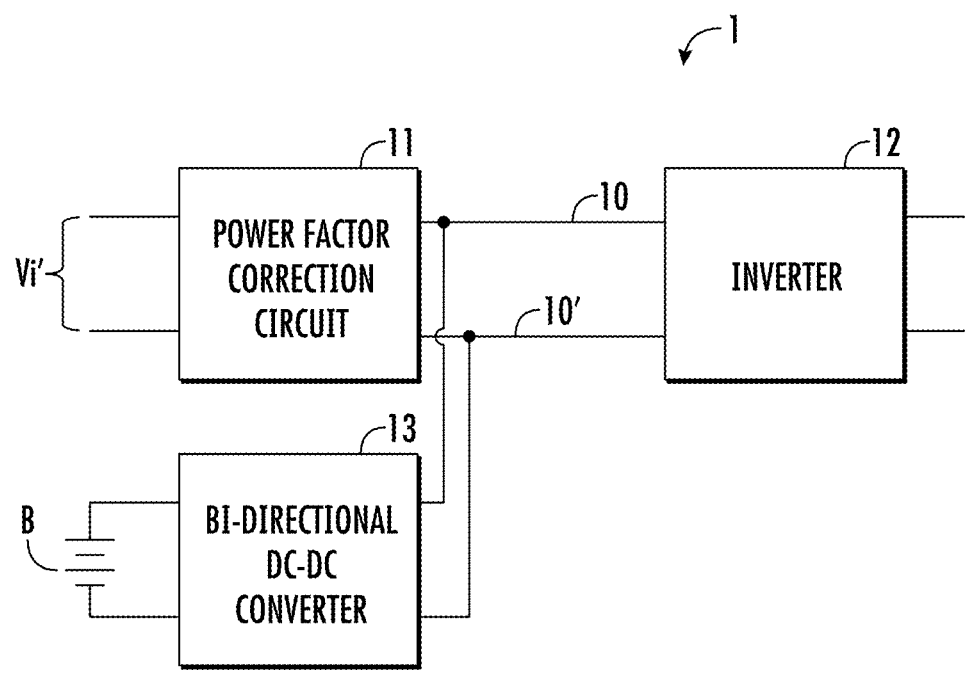
FIG. 1 is a circuit block diagram of an on-line uninterruptible power supply in the prior art.
Figure 2:
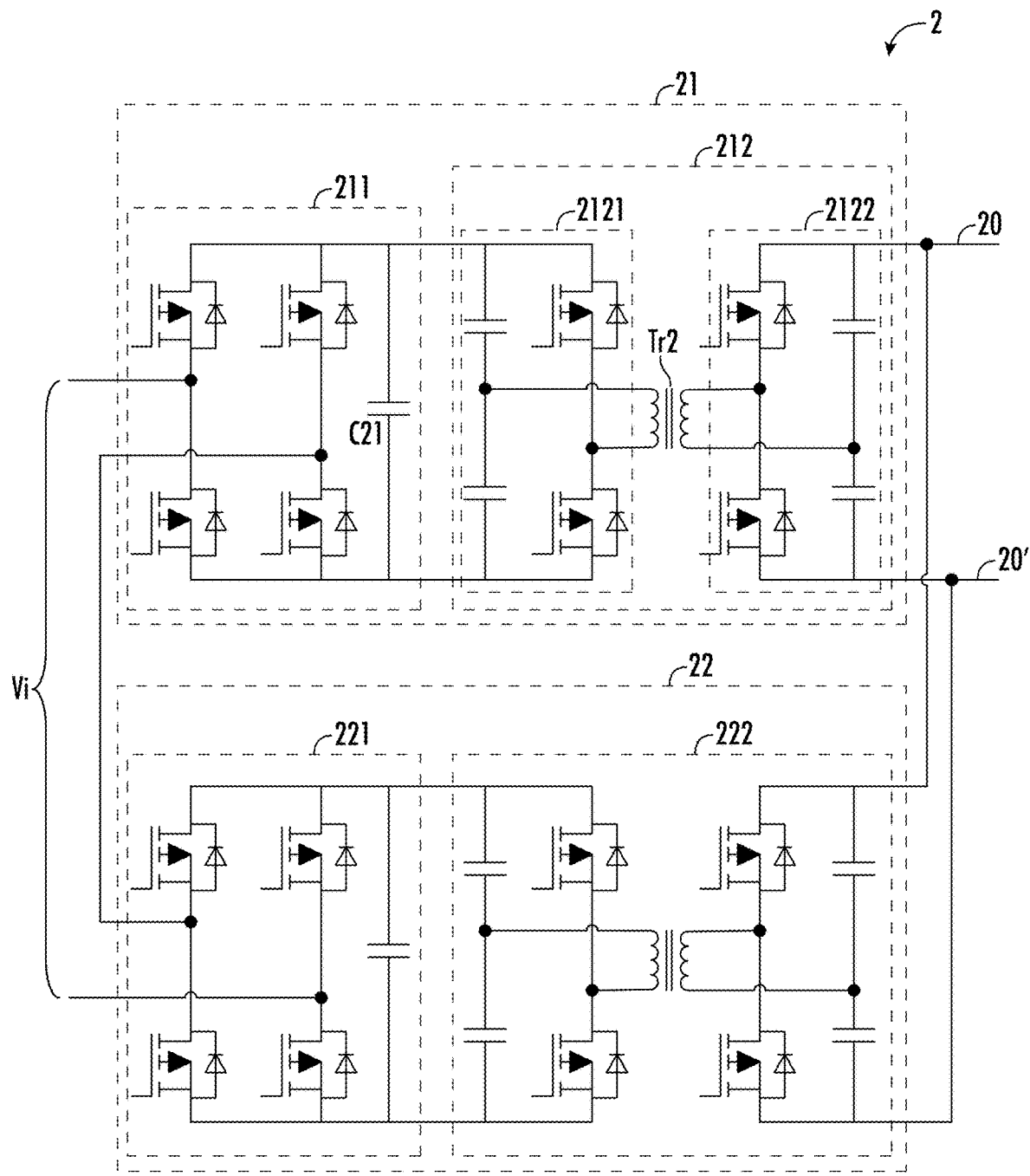
FIG. 2 is a circuit diagram of a power factor correction assembly according to a first embodiment of the present invention.

FIG. 2 is a circuit diagram of a power factor correction assembly according to a first embodiment of the present invention. As shown in FIG. 2, the power factor correction assembly 2 includes a power factor correction circuit 21 and a power factor correction circuit 22. Inputs of the power factor correction circuits 21, 22 are connected in series and then connected to a medium-voltage alternating current Vi (for example, 10 kilovolts). Outputs are connected in parallel between a positive direct-current bus 20 and a negative direct-current bus 20'.

The power factor correction circuit 21 includes a full-bridge pulse width modulated rectifier 211 and an isolated DC-DC converter 212 that are cascaded. The full-bridge pulse width modulated rectifier 211 includes four metal-oxide-semiconductor field effect transistors and a capacitor C21. The four metal-oxide-semiconductor field effect transistors are provided with a pulse-width modulated signal so that the current and voltage of an alternating current at an input of the full-bridge pulse width modulated rectifier 211 have the same phase, a power factor of the alternating current approximates 1, and meanwhile a required direct current is obtained on the capacitor C21.

The isolated DC-DC converter 212 includes a half-bridge inverter 2121, a transformer Tr2 and a half-bridge pulse width modulated rectifier 2122. An input of the half-bridge inverter 2121 is connected to an output of the full-bridge pulse width modulated rectifier 211, and an output of the half-bridge inverter 2121 is connected to a primary side of the transformer Tr2. An input of the half-bridge pulse width modulated rectifier 2122 is connected to a secondary side of the transformer Tr2, and an output of the half-bridge pulse width modulated rectifier 2122 is connected to (or serves as) the positive direct-current bus and the negative direct-current bus 20'.

The half-bridge inverter 2121 is controlled to convert the direct current on the capacitor C21 into a high-frequency alternating current and output the high-frequency alternating current to the primary side of the transformer Tr2, so as to obtain a high-frequency alternating current on the secondary side of the transformer Tr2. The half-bridge pulse width modulated rectifier 2122 is controlled to convert the alternating current on the secondary side of the transformer Tr2 into a direct current and transmit the direct current to the positive and negative direct-current buses 20, 20'.

The power factor correction circuit 22 has the same circuit structure as that of the power factor correction circuit 21, and also includes a full-bridge pulse width modulated rectifier 221 and an isolated DC-DC converter 222 that are cascaded. An input of the full-bridge pulse width modulated rectifier 221 is connected in series to the input of the full-bridge pulse width modulated rectifier 211. That is, one input terminal of the full-bridge pulse width modulated rectifier 221 is connected to one input terminal of the full-bridge pulse width modulated rectifier 211, and the other input terminal of the full-bridge pulse width modulated rectifier 221 and the other input terminal of the full-bridge pulse width modulated rectifier 211 are connected to the alternating current Vi. An output of the isolated DC-DC converter 222 and an output of the isolated DC-DC converter 212 are connected in parallel between the positive direct-current bus 20 and the negative direct-current bus 20'.

A control device (not shown in FIG. 2) controls the full-bridge pulse width modulated rectifiers 211, 221 to each operate, and the metal-oxide-semiconductor field effect transistors in each full-bridge pulse width modulated rectifier withstand a decreased voltage, so as to reduce the risk of the power factor correction assembly 2 failing and so that the input of the power factor correction assembly 2 can receive a medium-voltage alternating current having a large voltage value. Since the transmission efficiency of the medium-voltage alternating current is higher than the transmission efficiency of a low-voltage alternating current, the efficiency is improved.

In addition to achieving the function of reducing voltage, the transformer Tr2 further isolates a medium-voltage grid connected to the primary side from the low-voltage alternating current connected to the secondary side, thereby improving safety.

Meanwhile, since the magnetic core of the transformer Tr2 provides a magnetic loop for an alternating magnetic field produced by the high-frequency alternating current, magnetic saturation is not caused even with a magnetic core of very small size. Thus a high-frequency transformer of small size can be used, for example, a high-frequency transformer having a working frequency greater than 10 KHz is used. Compared with a line-frequency transformer of large size, the total size of all high-frequency transformers in the power factor correction assembly 2 in this embodiment is far smaller than the size of one line-frequency transformer; at the same time, a cabinet of small size can be used, and the plurality of power factor correction circuits in the power factor correction assembly 2 in this embodiment can have a small spacing between circuit modules during connection and assembly, so that the entire cabinet can be designed more compactly.

In other embodiments of the present invention, the power factor correction assembly 2 includes more than two power factor correction circuits. In practical applications, an appropriate number of power factor correction circuits are selected according to the voltage value of the alternating current Vi and the withstand voltage value of the metal-oxide-semiconductor field effect transistors. For example, when the alternating current Vi is a medium-voltage alternating current, far more than two power factor correction circuits are selected; inputs of the power factor correction circuits are connected in series and then connected to the medium-voltage alternating current; and outputs of the power factor correction circuits are connected in parallel between the positive direct-current bus and the negative direct-current bus. When the number of the power factor correction circuits increases, the input of the power factor correction assembly 2 can receive an alternating current having a larger voltage value.

Figure 3:
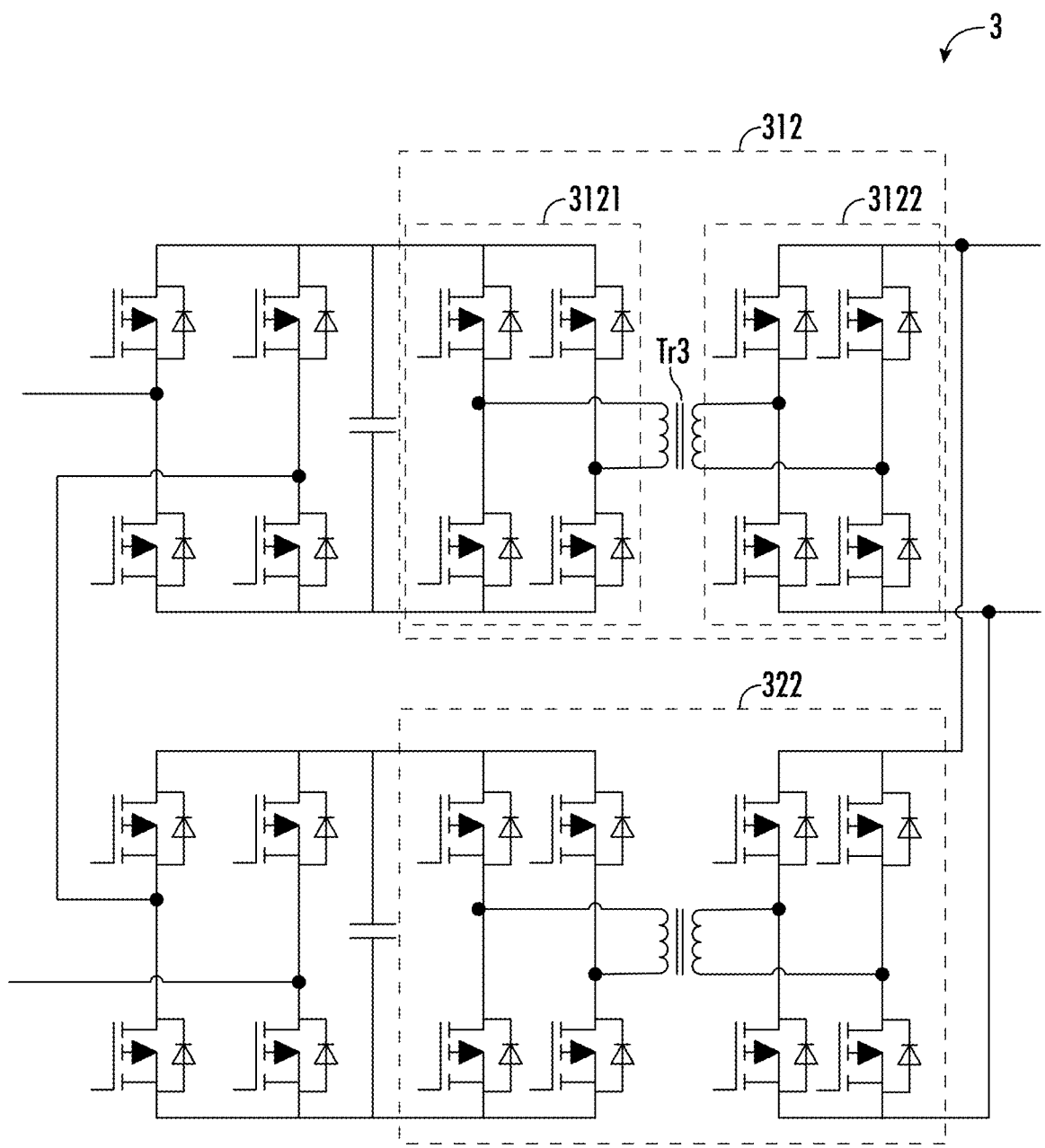
FIG. 3 is a circuit diagram of a power factor correction assembly according to a second embodiment of the present invention.

FIG. 3 is a circuit diagram of a power factor correction assembly according to a second embodiment of the present invention. As shown in FIG. 3, the power factor correction assembly 3 is basically the same as the power factor correction assembly 2 in FIG. 2. The difference lies in that the isolated DC-DC converter 312 includes a full-bridge inverter 3121 connected to a primary side of a transformer Tr3 and a full-bridge pulse width modulated rectifier 3122 connected to a secondary side of the transformer Tr3. The isolated DC-DC converter 322 is the same as the isolated DC-DC converter 312 and will not be described herein again.

Figure 4:
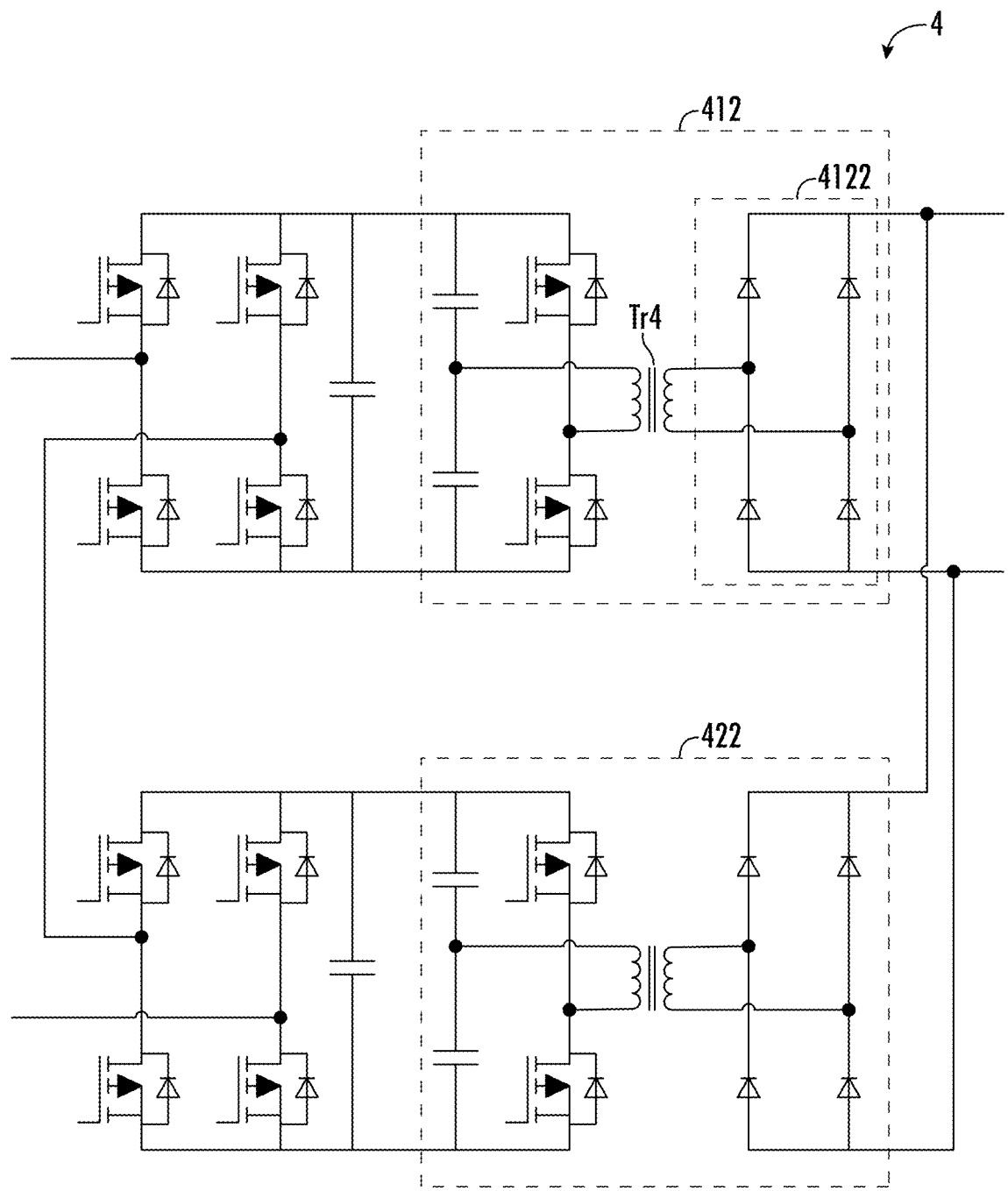
FIG. 4 is a circuit diagram of a power factor correction assembly according to a third embodiment of the present invention.

FIG. 4 is a circuit diagram of a power factor correction assembly according to a third embodiment of the present invention. As shown in FIG. 4, the power factor correction assembly 4 is basically the same as the power factor correction assembly 2 in FIG. 2. The difference lies in that the isolated DC-DC converter 412 includes a bridge rectifying circuit 4122 connected to a secondary side of a transformer Tr4. The isolated DC-DC converter 422 is the same as the isolated DC-DC converter 412 and will not be described herein again.

Figure 5:
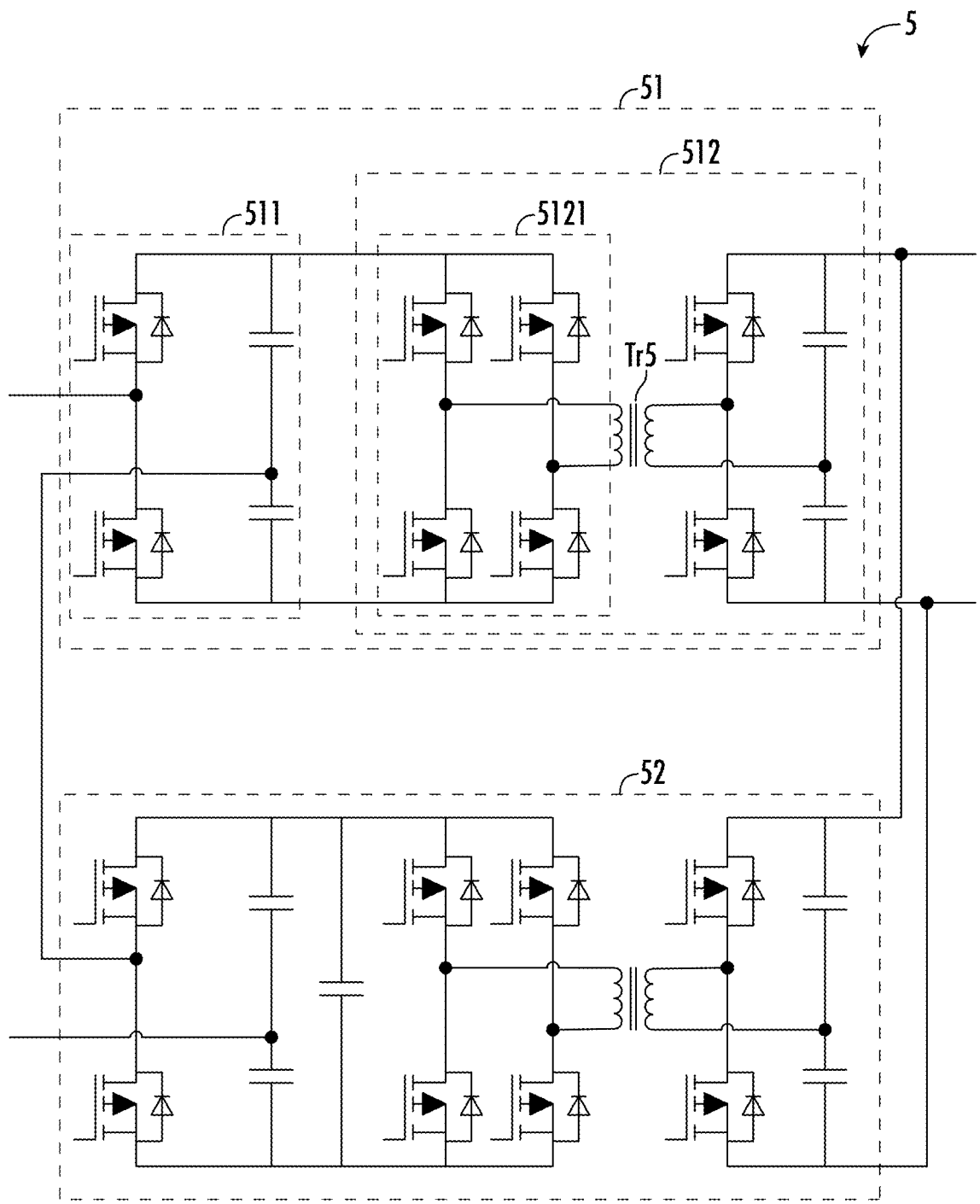
FIG. 5 is a circuit diagram of a power factor correction assembly according to a fourth embodiment of the present invention.

FIG. 5 is a circuit diagram of a power factor correction assembly according to a fourth embodiment of the present invention. As shown in FIG. 5, the power factor correction assembly 5 is basically the same as the power factor correction assembly 2 in FIG. 2. The difference lies in that the power factor correction circuit 51 includes a half-bridge pulse width modulated rectifier 511 and an isolated DC-DC converter 512 that are cascaded, where the isolated DC-DC converter 512 includes a full-bridge inverter 5121 connected to a primary side of the transformer Tr5. The power factor correction circuit 52 is the same as the power factor correction circuit 51 and will not be described herein again.

Figure 6:
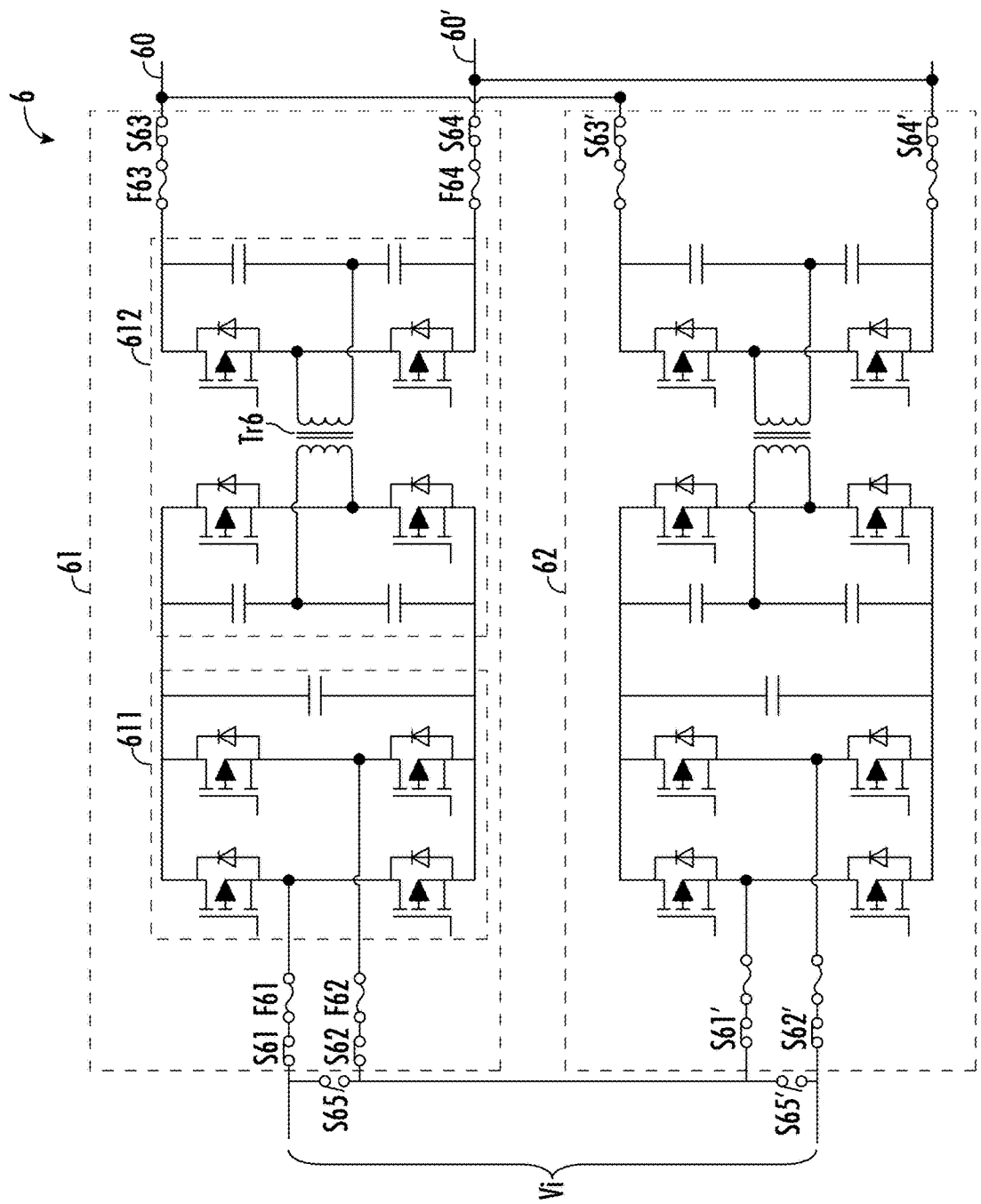
FIG. 6 is a circuit diagram of a power factor correction assembly according to a fifth embodiment of the present invention in a normal working state.

FIG. 6 is a circuit diagram of a power factor correction assembly according to a fifth embodiment of the present invention in a normal working state. As shown in FIG. 6, the power factor correction assembly 6 includes two identical power factor correction circuits 61, 62. Only the power factor correction circuit 61 is used as an example for description below.

The power factor correction circuit 61 is basically the same as the power factor correction circuit 21 in FIG. 2. The difference lies in that the power factor correction circuit 61 further includes a switch S61 and a fuse F61 connected in series to one input terminal of a full-bridge pulse width modulated rectifier 611, and a switch S62 and a fuse F62 connected in series to the other input terminal of the full-bridge pulse width modulated rectifier 611; and a fuse F63 and a switch S63 connected in series to one output terminal of an isolated DC-DC converter 612, and a fuse F64 and a switch S64 connected in series to the other output terminal of the isolated DC-DC converter 612.

The power factor correction assembly 6 further includes a switch S65 and a switch S65'. The switch S65 is connected between inputs of the power factor correction circuit 61, and the switch S65' is connected between inputs of the power factor correction circuit 62.

As shown in FIG. 6, in the normal operating state, a control device (not shown in FIG. 6) controls the switch S65 and the switch S65' to be in an OFF state; controls the switches S61, S62, S63, and S64 in the power factor correction circuit 61 to be all in an ON state; and controls the switches S61', S62', S63', and S64' in the power factor correction circuit 62 to be all in an ON state. At this time, the inputs of the power factor correction circuit 61 and the power factor correction circuit 62 are connected in series, and the outputs are connected in parallel between a positive direct-current bus 60 and a negative direct-current bus 60'. The power factor correction assembly 6 has the same equivalent circuit as that of the power factor correction assembly 2 shown in FIG. 2. The working mode thereof will not be described herein again.

Figure 7:
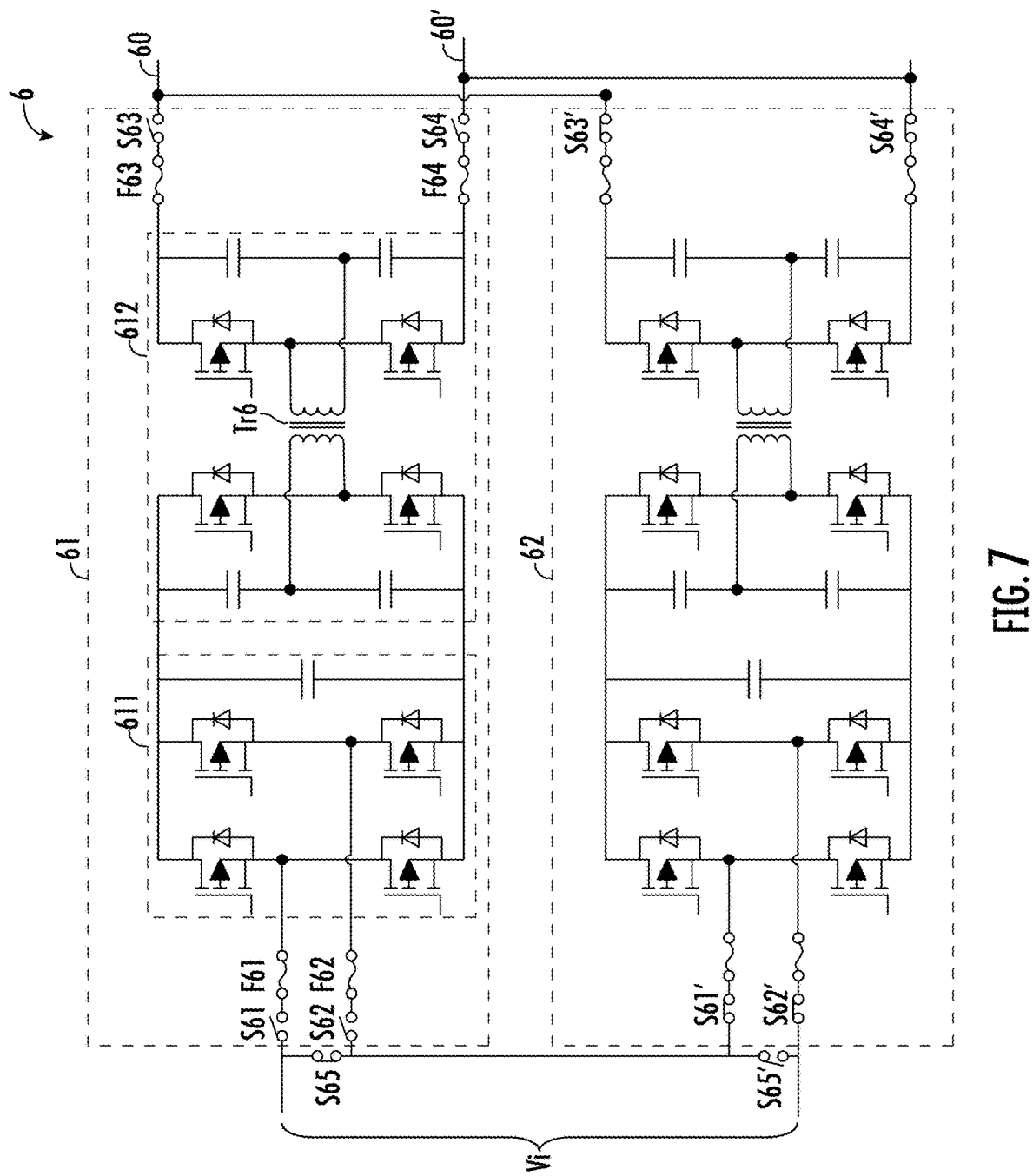
FIG. 7 is a circuit diagram of the power factor correction assembly shown in FIG. 6 with one power factor correction circuit failed.

FIG. 7 is a circuit diagram of the power factor correction assembly shown in FIG. 6 with one power factor correction circuit failed. As shown in FIG. 7, when a failure occurs in the circuit on a primary side of a transformer Tr6 in the power factor correction circuit 61, the fuse F61 and the fuse F62 will blow; or when a failure occurs in the circuit on a secondary side of the transformer Tr6, the fuse F63 and the fuse F64 will blow. Then, the switch S65 is controlled to turn ON to short-circuit the input of the power factor correction circuit 61. Afterwards, the switches S61, S62, S63 and S64 are controlled to turn OFF. At this time, since the full-bridge pulse width modulated rectifier 611 is short-circuited by the turned ON switch S65, an alternating current Vi is connected to the input of the power factor correction circuit 62 through the turned ON switch S65, thereby not affecting operation of the power factor correction circuit 62 (in other words, not affecting the normal operation of a power factor correction circuit that does not have a failure in the power factor correction assembly).

After the switches S61, S62, S63 and S64 are controlled to turn OFF, maintenance personnel can remove the failed power factor correction circuit 61 and then reconnect a new power factor correction circuit 61 to the power factor correction assembly 6. Next, the switches S61, S62, S63 and S64 are controlled to turn ON, and then the switch S65 is controlled to turn OFF. At this time, the input of the power factor correction circuit 61 and the input of the power factor correction circuit 62 are connected in series, whereas the output of the power factor correction circuit 61 and the output of the power factor correction circuit 62 are connected in parallel between the positive and negative direct-current buses 60, 60'.

Thus, even if other power factor correction circuits in the power factor correction assembly 6 fail, the maintenance personnel can replace the failed power factor correction circuit while the power factor correction assembly 6 is still in operation. Therefore, the power factor correction assembly 6 implements the on-line service and hot-swap function.

In other embodiments of the present invention, the switches S61 to S65 and the fuses F61 to F64 shown in FIG. 6 are connected to each power factor correction circuit in the power factor correction assembly 3, 4 or 5.

In other embodiments of the present invention, other rectifier devices may further be used in place of the half-bridge pulse width modulated rectifier 2122, the full-bridge pulse width modulated rectifier 3122, or the bridge rectifying circuit 4122 in the aforementioned embodiment.

In other embodiments of the present invention, the power factor correction assembly includes more than two power factor correction circuits. When a failure occurs in one or a plurality of power factor correction circuits in the power factor correction assembly, the power factor correction assembly can still operate, thereby greatly improving operation reliability. Meanwhile, the one or plurality of failed power factor correction circuits can be replaced without interrupting operation of the power factor correction assembly.

The power factor correction assemblies 2, 3, 4, 5 and 6 in the aforementioned embodiments of the present invention all include the same power factor correction circuits. Hence mass production can be carried out and replacing a failed power factor correction circuit is convenient, thereby effectively avoiding connection failure and mis-assembly. Moreover, the control process of the control device over the same power factor correction circuits is simple.

Figure 8:
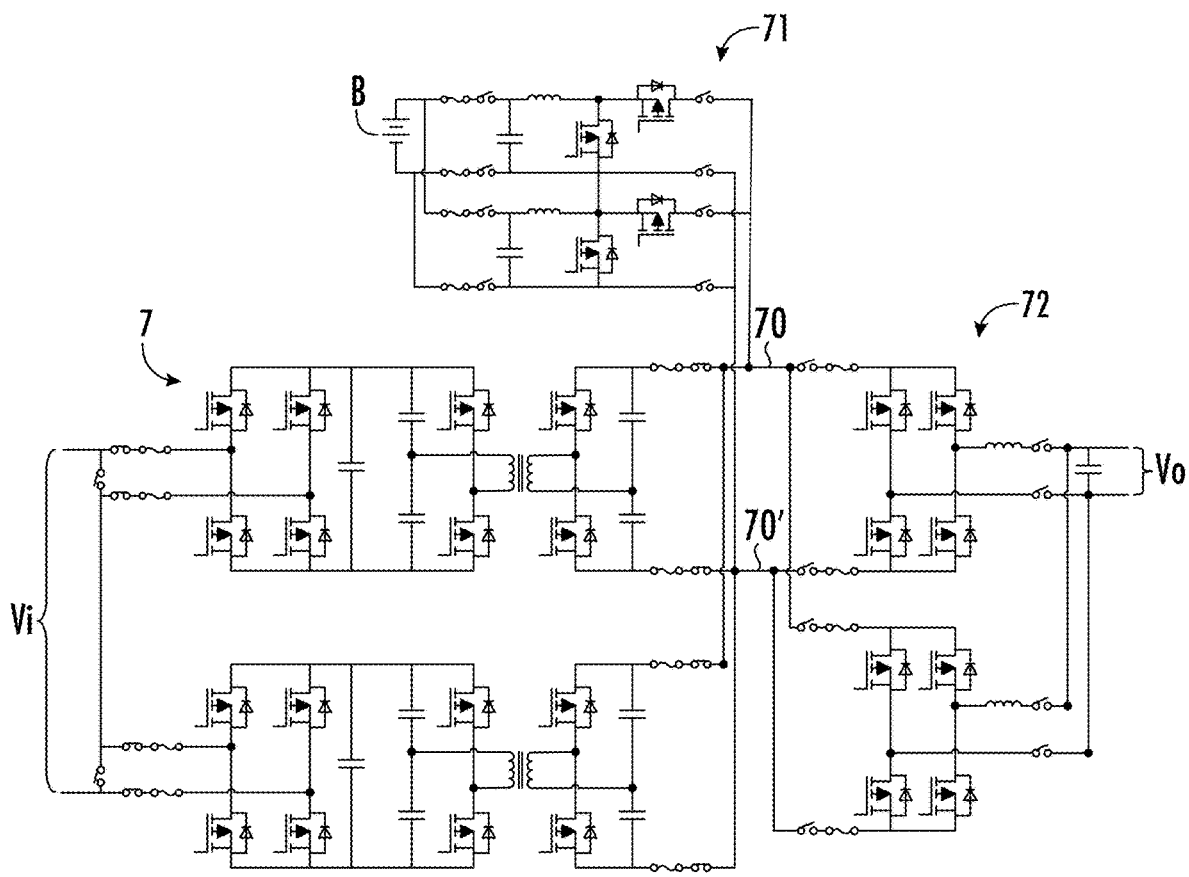
FIG. 8 is a circuit diagram of an on-line uninterruptible power supply according to a first embodiment of the present invention.

FIG. 8 is a circuit diagram of an on-line uninterruptible power supply according to a first embodiment of the present invention. As shown in FIG. 8, the on-line uninterruptible power supply includes a power factor correction assembly 7, a bi-directional DC-DC converter 71, and an inverter assembly 72.

The power factor correction assembly 7 is the same as the power factor correction assembly 6 and will not be described herein again. The bi-directional DC-DC converter assembly 71 is connected between a rechargeable battery B and positive and negative direct-current buses 70, 70'. An input of the inverter assembly 72 is connected to the positive and negative direct-current buses 70, 70', and an output of the inverter assembly 72 is used for providing an alternating current Vo to a load.

Figure 9:
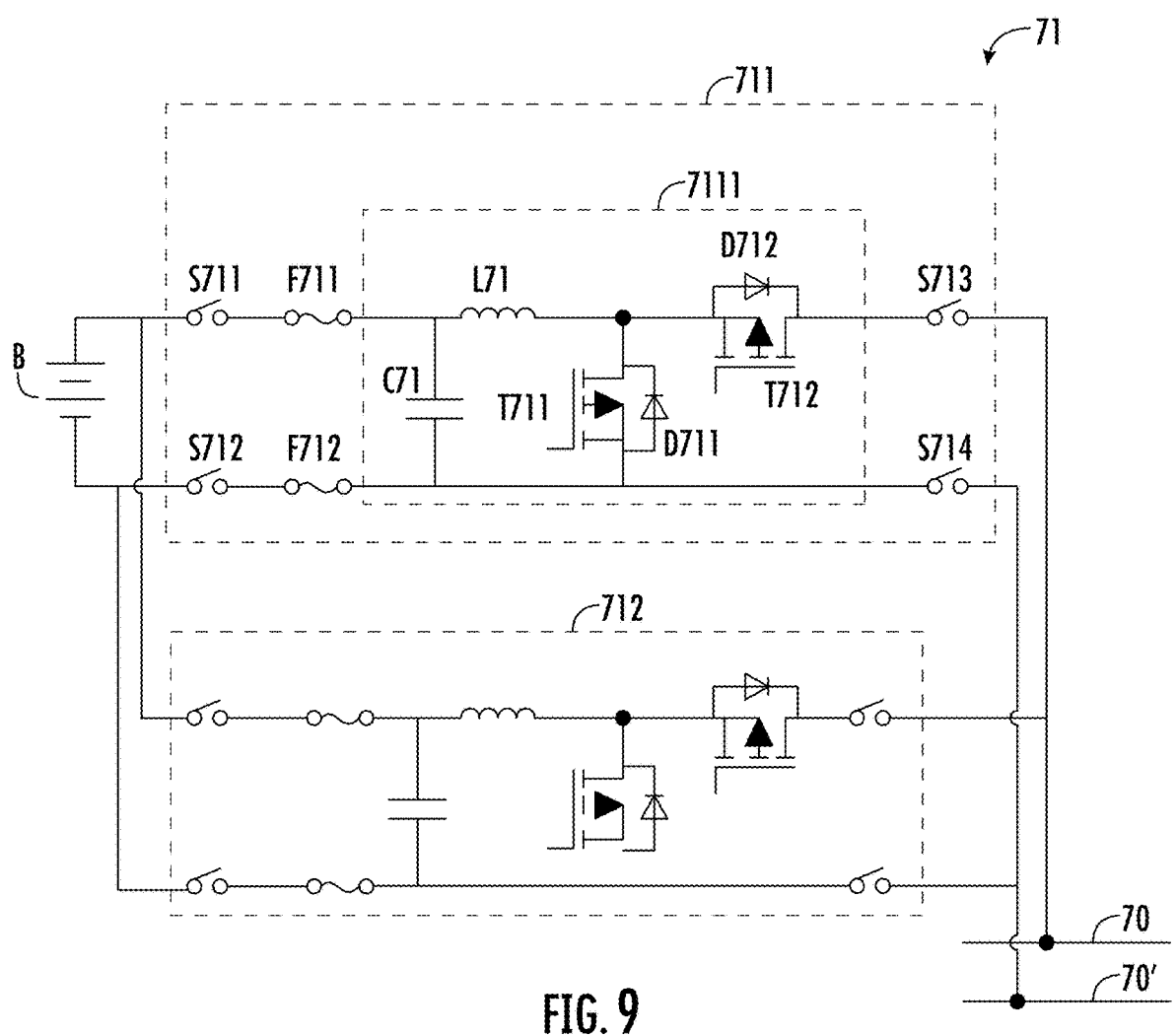
FIG. 9 is a schematic enlarged view of a bi-directional DC-DC converter assembly in FIG. 8.

FIG. 9 is a schematic enlarged view of the bi-directional DC-DC converter assembly in FIG. 8. As shown in FIG. 9, the bi-directional DC-DC converter assembly 71 includes bi-directional DC-DC converters 711, 712 connected in parallel. That is, the bi-directional DC-DC converters 711, 712 are both connected between the rechargeable battery B and the positive and negative direct-current buses 70, 70'.

The bi-directional DC-DC converters 711, 712 have the same circuit structure. Only the bi-directional DC-DC converter 711 is used as an example for description below. The bi-directional DC-DC converter 711 includes a bi-directional DC-DC conversion circuit 7111; a switch S711 and a fuse F711 connected in series to a positive terminal of a first connection end of the bi-directional DC-DC conversion circuit 7111; a switch S712 and a fuse F712 connected in series to a negative terminal of the first connection end of the bi-directional DC-DC conversion circuit 7111; and a switch S713 and a fuse F714 respectively connected to a positive terminal and a negative terminal of a second connection end of the bi-directional DC-DC conversion circuit 7111.

The bi-directional DC-DC conversion circuit 7111 includes a metal-oxide-semiconductor field effect transistor T711 having an anti-parallel diode D711; a metal-oxide-semiconductor field effect transistor T712 having an anti-parallel diode D712; and an inductor L71 and a capacitor C71. The inductor L71, the metal-oxide-semiconductor field effect transistor T711 and the anti-parallel diode D712 are connected to form a Boost circuit; at the same time, the metal-oxide-semiconductor field effect transistor T711, the anti-parallel diode D711, and the inductor L71 are connected to form a Buck circuit. The capacitor C71 is connected between one end of the inductor L71 and an anode of the anti-parallel diode D711 and is used for filtering a high-frequency alternating current to effectively protect the rechargeable battery B.

If the bi-directional DC-DC converters 711, 712 are both normal (namely, having no failure), in an on-line working mode (that is, the mains supply is normal), a control device (not shown in FIG. 9) controls the bi-directional DC-DC converters 711, 712 to achieve buck conversion, so as to store electric energy on the positive and negative direct-current buses 70, 70' into the rechargeable battery B; in a battery mode (that is, the mains supply fails), the bi-directional DC-DC converters 711, 712 are controlled to achieve boost conversion, so as to store electric energy in the rechargeable battery B into the positive and negative direct-current buses 70, 70'.

If a failure occurs in the bi-directional DC-DC conversion circuit 7111, the fuses F711, F712 will blow, and the control device controls the switches S711, S712, S713 and S714 to be in an OFF state. Since the bi-directional DC-DC converter 712 connected in parallel to the bi-directional DC-DC converter 711 is still in the working state, discharging or charging of the rechargeable battery B is not affected. At this time, the maintenance personnel can remove the failed bi-directional DC-DC converter 711 from the bi-directional DC-DC converter assembly 71 and replace it with a new bi-directional DC-DC converter 711, and finally control the switches S711, S712, S713, and S714 to turn ON, so as to reconnect the bi-directional DC-DC converter 711 to the bi-directional DC-DC converter assembly 71.

In other embodiments of the present invention, the fuse F711 and the fuse F712 are respectively connected in series to the switches S713 and S714.

In other embodiments of the present invention, the bi-directional DC-DC converter assembly 71 includes more than two bi-directional DC-DC converters, and the plurality of bi-directional DC-DC converters are connected in parallel and then connected between the rechargeable battery B and the positive and negative direct-current buses. The plurality of bi-directional DC-DC converters operate simultaneously, which not only provides high output power but also effectively protects components in the bi-directional DC-DC converter assembly 71 from damage, thereby reducing the risk of failure.

In other embodiments of the present invention, a DC-DC converter and a charger that are separate are used in place of the bi-directional DC-DC conversion circuit 7111 in the aforementioned embodiment, where an input of the charger is connected to an output of the DC-DC converter, and an output of the charger is connected to an input of the DC-DC converter.

Figure 10:
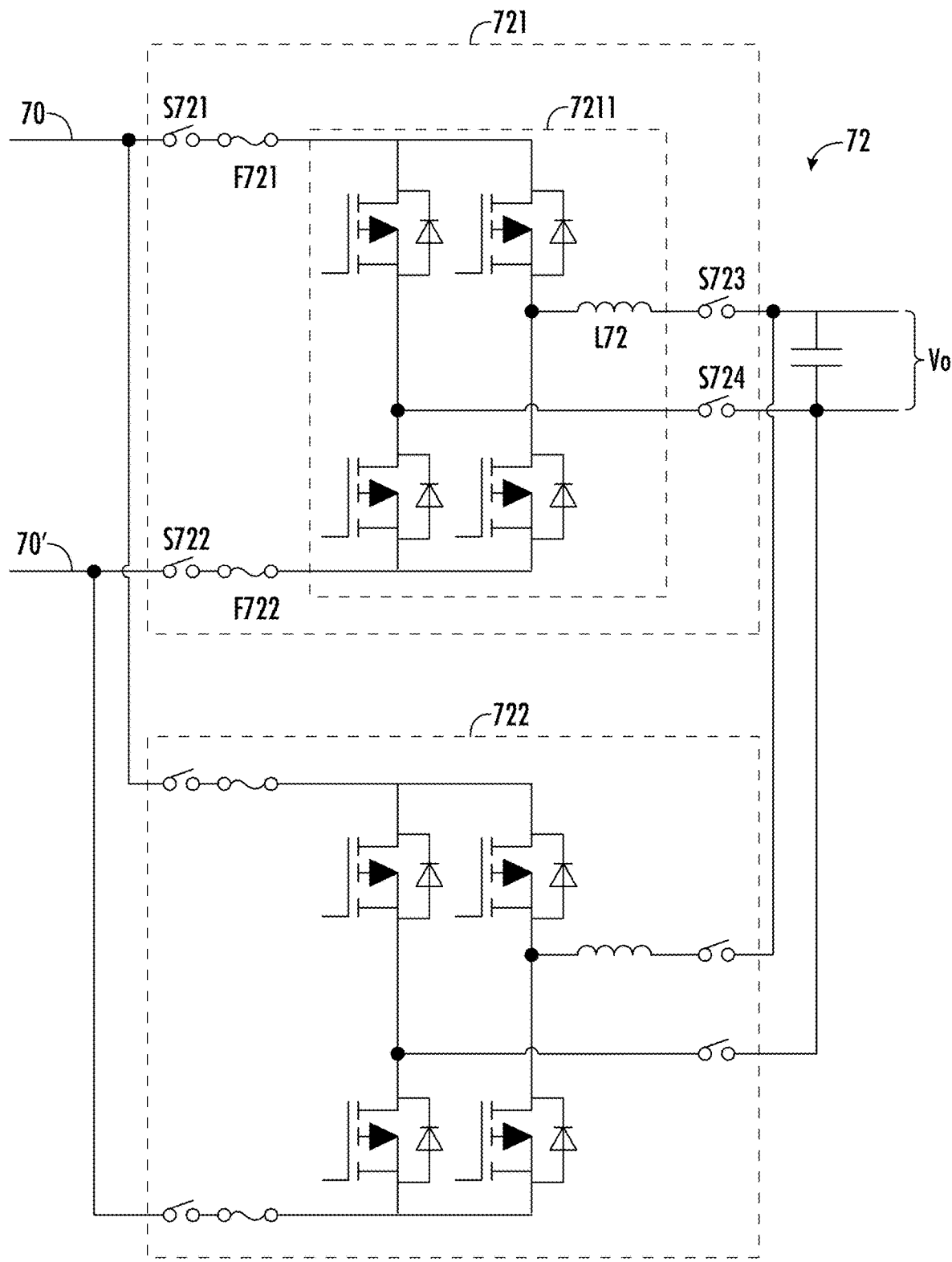
FIG. 10 is a schematic enlarged view of an inverter assembly in FIG. 8.

FIG. 10 is a schematic enlarged view of the inverter assembly in FIG. 8. As shown in FIG. 10, the inverter assembly 72 includes two inverters 721, 722 connected in parallel. That is, inputs of the inverters 721, 722 are both connected to the positive and negative direct-current buses 70, 70', and outputs of the inverters 721, 722 are connected together and provide the required alternating current Vo to the load.

The inverters 721, 722 have the same circuit structure. Only the inverter 721 is used as an example for description below. The inverter 721 includes a full-bridge inversion circuit 7211 formed by connecting four metal-oxide-semiconductor field effect transistors and an inductor L72; a switch S721 and a fuse F721 connected in series between a positive input terminal of the full-bridge inversion circuit 7211 and the positive direct-current bus 70; a switch S722 and a fuse F722 connected in series between a negative input terminal of the full-bridge inversion circuit 7211 and the negative direct-current bus 70'; and output switches S723, S724 connected to two output terminals of the full-bridge inversion circuit 7211. Under normal operating conditions, the switches S721, S722 and the output switches S723, S724 are all in an ON state. The control mode of the full-bridge inversion circuit 7211 is the same as that in the prior art and will not be described herein again.

If a failure occurs in a full-bridge inversion circuit (for example, the full-bridge inversion circuit 7211) of the inverter assembly 72, the fuses F721 and F722 will blow, and a control device (not shown in FIG. 10) controls the switches S721, S722 and the output switches S723, S724 to be in an OFF state. Since other inverters (for example, the inverter 722) in the inverter assembly 72 are still in an operating state, supply of the alternating current Vo to the load is not affected. At this time, the maintenance personnel can remove the failed inverter 721 and replace it with a new inverter 721, and then the control device controls the switches S721, S722 and the output switches S723, S724 to be in an ON state, and the inverter 721 will be reconnected to the inverter assembly 72.

The inverter assembly 72 in the present invention is not limited to being formed by two inverters connected in parallel, and may also be formed by more than two inverters connected in parallel in other embodiments of the present invention. When the positive and negative direct-current buses 70, 70' can provide high power, the inverter assembly 72 in this embodiment not only can increase output power but also can reduce the risk of damage to each inverter.

After a failure occurs in one or a plurality of inverters in the inverter assembly of the present invention, the maintenance personnel can also replace the failed inverter while the inverter assembly continues working and provides an alternating current, thereby improving operation reliability.

In other embodiments of the present invention, a half-bridge inversion circuit is used in place of the full-bridge inversion circuit in the inverter assembly 72.

Figure 11:
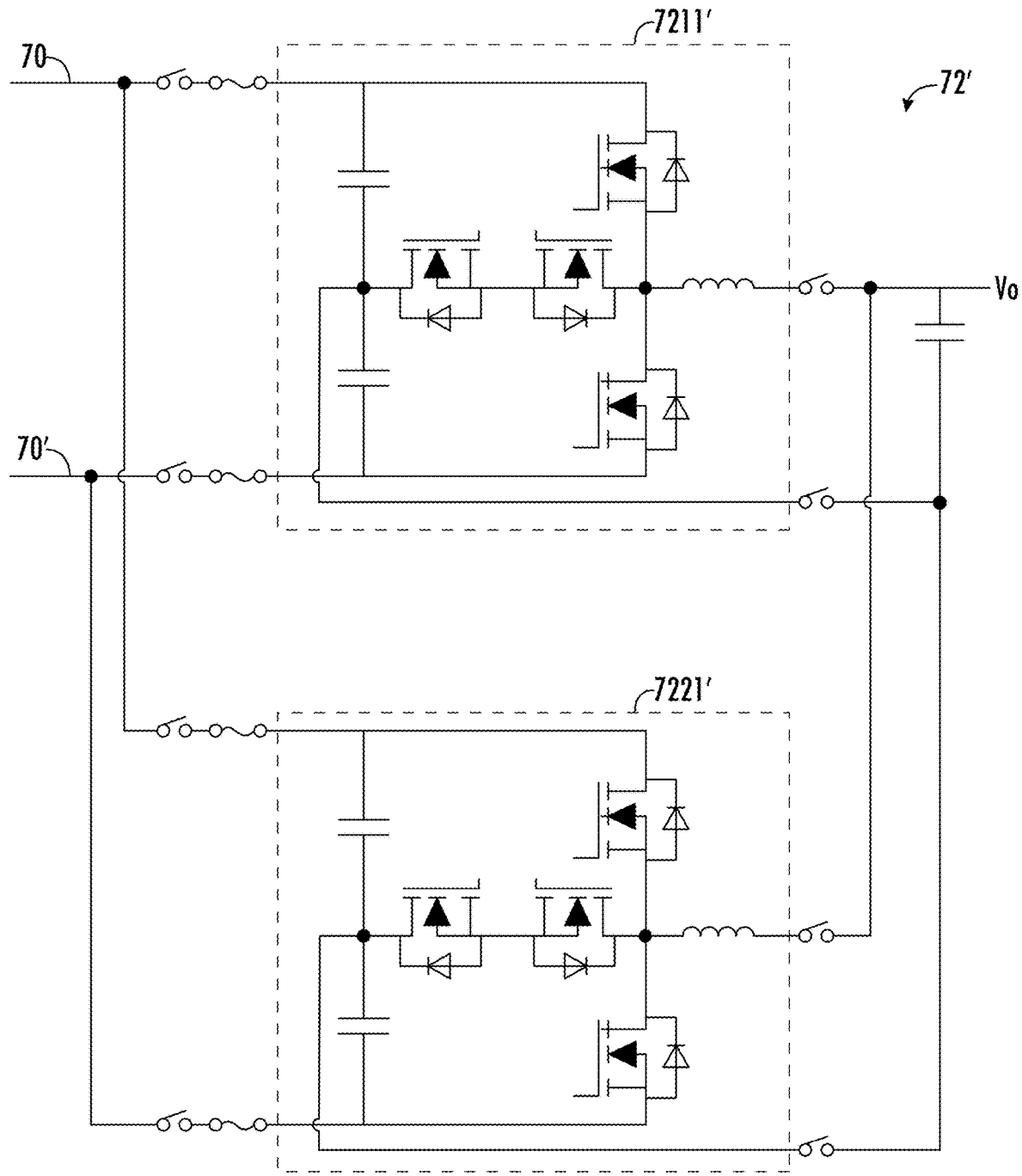
FIG. 11 is a circuit diagram of an inverter assembly in an on-line uninterruptible power supply according to a second embodiment of the present invention.

FIG. 11 is a circuit diagram of an inverter assembly in an on-line uninterruptible power supply according to a second embodiment of the present invention. As shown in FIG. 11, the inverter assembly 72' is basically the same as the inverter assembly 72 shown in FIG. 10. The difference lies in that T-type three-level inverters 7211', 7221' are used respectively in place of the two full-bridge inversion circuits in FIG. 10. The replacement mode of a failed T-type three-level inverter in the inverter assembly 72' is the same as the replacement mode of the full-bridge inversion circuit in FIG. 10 and will not be described herein again.

In other embodiments of the present invention, other inverters such as I-type three-level inverters are used respectively in place of the T-type three-level inverters 7211', 7221' in FIG. 11.

Figure 12:
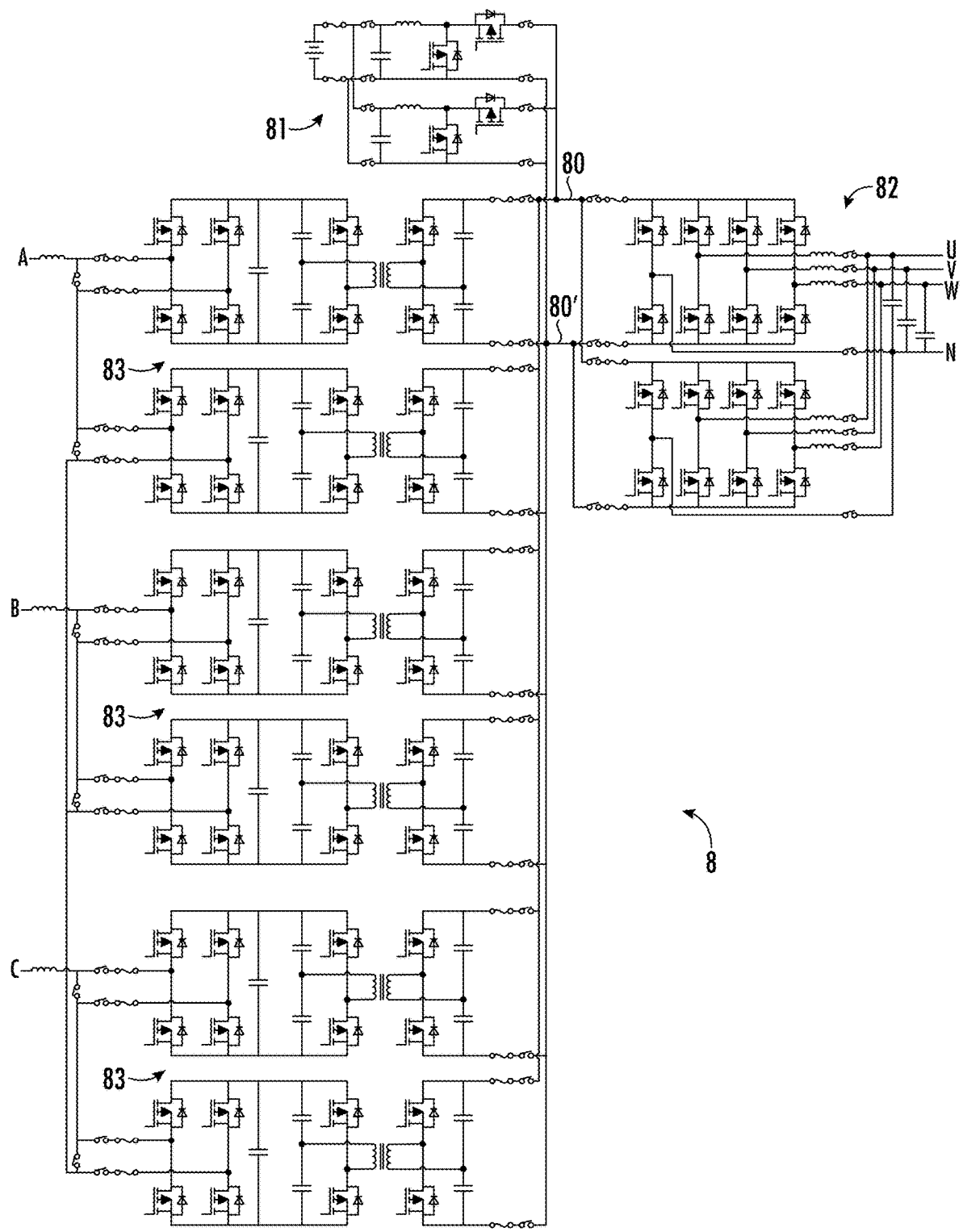
FIG. 12 is a circuit diagram of an on-line uninterruptible power supply according to a third embodiment of the present invention.

FIG. 12 is a circuit diagram of an on-line uninterruptible power supply according to a third embodiment of the present invention. As shown in FIG. 12, the on-line uninterruptible power supply 8 includes three identical power factor correction assemblies 83, a bi-directional DC-DC converter 81 and a three-phase inverter assembly 82. Inputs of the three power factor correction assemblies 83 are respectively connected to medium-voltage alternating currents of three phases A, B and C whereas outputs are all connected in parallel to positive and negative direct-current buses 80, 80'. The bi-directional DC-DC converter 81 is connected between a rechargeable battery and the positive and negative direct-current buses 80, 80'. An input of the three-phase inverter assembly 82 is connected to the positive and negative direct-current buses 80, 80', and an output of the three-phase inverter assembly 82 is used for providing low-voltage alternating currents of three phases U, V and W.

The power factor correction assemblies 83 have the same circuit structure as that of the power factor correction assembly 6 shown in FIG. 6, and the bi-directional DC-DC converter 81 has the same circuit structure as that of the bi-directional DC-DC converter 71 shown in FIG. 9, which will not be described herein again.

Figure 13:
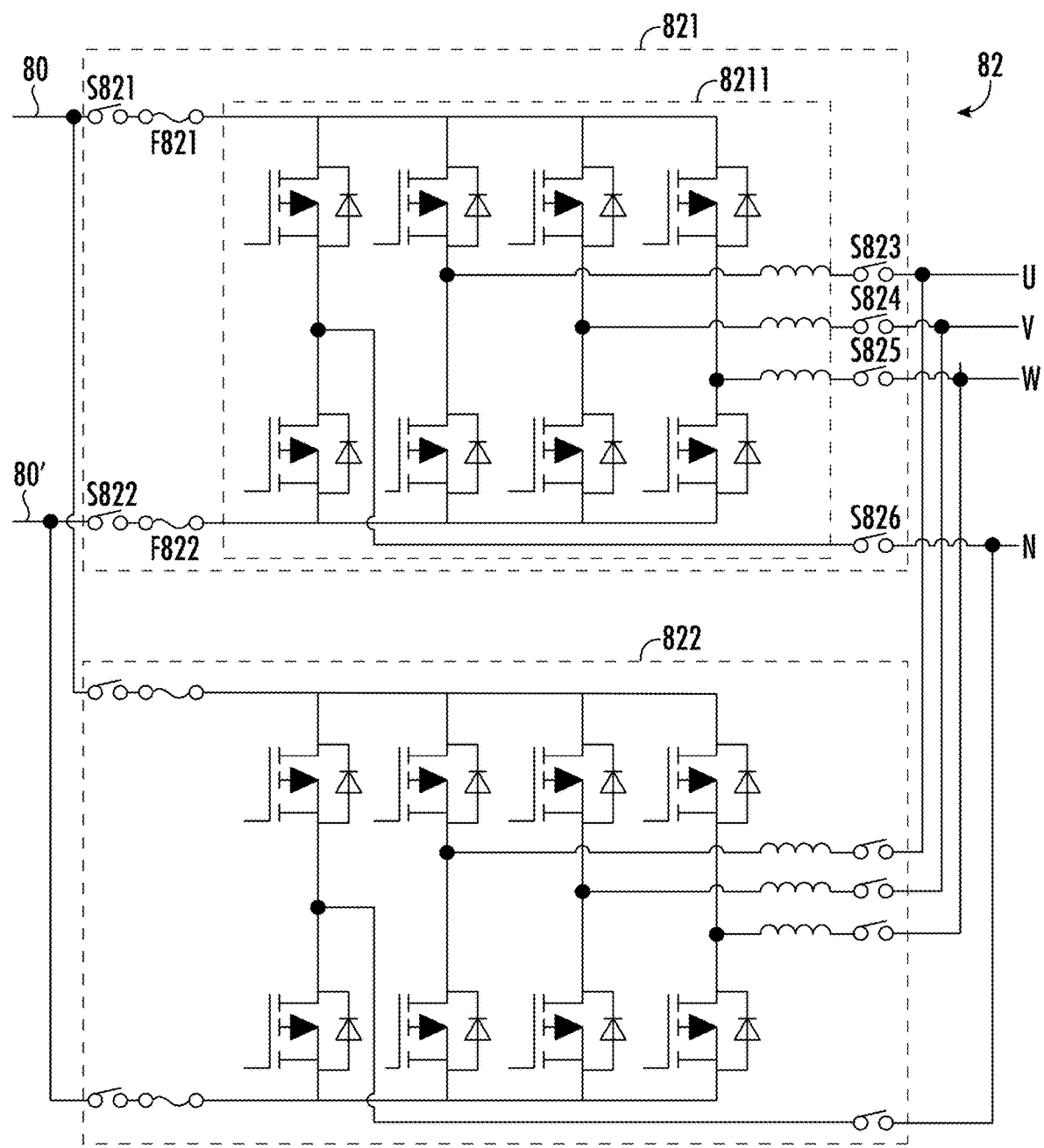
FIG. 13 is a schematic enlarged view of a three-phase inverter assembly in FIG. 12.

FIG. 13 is a schematic enlarged view of a three-phase inverter assembly in FIG. 12. As shown in FIG. 13, the three-phase inverter assembly 82 includes two three-phase inverters 821, 822 connected in parallel. That is, an input of the three-phase inverter 821 and an input of the three-phase inverter 822 are connected in parallel to the positive and negative direct-current buses 80, 80'; one output terminal of the three-phase inverters 821, 822 is connected to a neutral line N; and the remaining three output terminals are connected in parallel and used for providing the alternating currents of three phases U, V and W.

The three-phase inverters 821, 822 have the same circuit structure. Only the three-phase inverter 821 is used as an example for description below. The three-phase inverter 821 includes a three-phase four-leg inversion circuit 8211; a switch S821 and a fuse F821 connected in series between the positive direct-current bus 80 and a positive input terminal of the three-phase four-leg inversion circuit 8211; a switch S822 and a fuse F822 connected in series between the negative direct-current bus 80' and a negative input terminal of the three-phase four-leg inversion circuit 8211; and an output switch S823, an output switch S824, an output switch S825 and an output switch S826 respectively connected to four output terminals of the three-phase four-leg inversion circuit 8211.

In a normal operating state, a control device (not shown in FIG. 13) controls all switches in the three-phase inverters 821, 822 to turn ON and controls three-phase four-leg inversion circuits to work to invert a direct current between the positive and negative direct-current buses 80, 80' into a three-phase alternating current, so as to obtain low-voltage (for example, 400 volts, 480 volts or 600 volts) alternating currents of three phases U, V and W at the output thereof.

If a failure occurs in the three-phase four-leg inversion circuit 8211 in the three-phase inverter 821, the fuse F821 and the fuse F822 blow, and the control device controls the switches S821, S822 and the output switches S823, S824, S825, S826 in the three-phase inverter 821 to be in an OFF state. Since the three-phase inverter 822 connected in parallel to the three-phase inverter 821 is still in the operating state, the maintenance personnel can remove the failed three-phase inverter 821 and replace it with a new three-phase inverter 821 without affecting the three-phase inverter 822 providing low-voltage alternating currents of three phases U, V and W. Finally, the control device controls the switches S821, S822 and the output switches S823, S824, S825, S826 to be in an ON state.

In the on-line uninterruptible power supply 8 of the present invention, the three power factor correction assemblies 83 are the same, and the three-phase inverters 821, 822 are the same. Hence mass production can be carried out, replacement and maintenance are convenient, and the operator can conveniently conduct assembly and connection, thereby avoiding misassembly.

In other embodiments of the present invention, the three-phase inverter assembly 82 includes more than two three-phase inverters connected in parallel, thereby reducing the risk of failure of each of the three-phase inverters connected in parallel, and providing higher output power to increase power density.

In other embodiments of the present invention, a three-phase inversion circuit such as a three-phase three-leg inversion circuit, a T-type three-level three-phase inversion circuit or an I-type three-level three-phase inversion circuit may further be used in place of the three-phase four-leg inversion circuit in the aforementioned embodiment. Accordingly, three output switches are connected to output terminals of such three-phase inversion circuits.

In another embodiment of the present invention, an input of the on-line uninterruptible power supply is connected to a single-phase alternating current, and an output of the on-line uninterruptible power supply is used for providing a three-phase alternating current.

In still another embodiment of the present invention, the input of the on-line uninterruptible power supply is connected to a three-phase alternating current, and the output of the on-line uninterruptible power supply is used for providing a single-phase alternating current.

In other embodiments of the present invention, a switching tube such as an insulated gate bipolar transistor having an anti-parallel diode may further be used in place of the metal-oxide-semiconductor field effect transistor in the aforementioned embodiment.

Although the present invention has been described through preferred embodiments, the present invention is not limited to the embodiments described herein, but includes various changes and variations made without departing from the scope of the present invention.

The invention claimed is:

1. An uninterruptible power supply comprising:
   a plurality of power factor correction circuits, each comprising:
   a pulse width modulated first rectifier;
   a first inverter having an input connected to an output of the pulse width modulated first rectifier;
   a transformer having a primary side connected to an output of the first inverter; and
   a second rectifier having an input connected to a secondary side of the transformer;
   a DC bus configured to be selectively connected to outputs of the second rectifiers of the power factor correction circuits; and
   at least one second inverter having an input configured to be connected to the DC bus and an output configured to be connected to a load.

2. The uninterruptible power supply of claim 1, comprising a first interconnection circuit configured to connect the inputs of the pulse width modulated first rectifiers in series to an AC source in a first mode of operation and to individually connect the input of a first one of the pulse width modulated first rectifiers to the AC source while disconnecting the input of a second one of the pulse width modulated first rectifiers from the AC source in a second mode of operation.

3. The uninterruptible power supply of claim 2, comprising a second interconnection circuit configured to connect the outputs of the second rectifiers in series to the DC bus in the first mode of operation and to individually connect the output of a first one of the second rectifiers to the DC bus while disconnecting the output of a second one of the second rectifiers from the DC bus in the second mode of operation.

4. The uninterruptible power supply of claim 3, wherein the first and second interconnection circuits comprise respective switch and fuse networks.

* * * * *